United States Patent [19]

Rollet et al.

[11] Patent Number: 4,823,163

[45] Date of Patent: Apr. 18, 1989

[54] APPARATUS FOR MARKING THE BACKS OF PHOTOGRAPHIC PROOFS

[75] Inventors: Georges Rollet, Les Cotes d'Arey; Bernard Alexandre, Vienne, both of France

[73] Assignee: Societe Inter-Color, Lyon, France

[21] Appl. No.: 171,476

[22] Filed: Mar. 21, 1988

[30] Foreign Application Priority Data

Mar. 19, 1987 [FR] France ................................ 87 04185

[51] Int. Cl.$^4$ ................................................ G03B 27/52

[52] U.S. Cl. .......................................... 355/41; 355/39

[58] Field of Search .............................. 355/40, 41, 39

[56] References Cited

U.S. PATENT DOCUMENTS

| | | | |
|---|---|---|---|
| 3,263,555 | 8/1966 | Scheib | 355/40 |
| 3,402,651 | 9/1968 | Pieronek et al. | 355/41 |
| 3,516,741 | 6/1970 | Thaddey | 355/41 |
| 3,576,369 | 4/1971 | Wick et al. | 355/40 |
| 3,881,820 | 5/1975 | Muir | 355/41 |
| 4,629,312 | 12/1986 | Pearce et al. | 355/41 |

*Primary Examiner*—Monroe H. Hayes

*Attorney, Agent, or Firm*—Herbert Dubno; Andrew Wilford

[57] ABSTRACT

An apparatus for marking the back of a photographic proof with data corresponding to data on the corresponding negatives in a system where the negatives are on a film strip having at each negative an edge notch and the proofs are on a print strip having spaced cutouts comprises a film drive for advancing same from the upstream to the downstream drive roll past a read location. A sensor detects the film-advance speed and generates an output corresponding thereto. A print drive advances this strip past a write location. Another sensor detects the paper-advance speed and generates an output corresponding thereto. A controller is connected to at least one of the drives and to the sensors for synchronizing displacement of the strips past the respective locations such that each proof is at the write location generally when the respective negative is at the read location. Another detector generates an output each time a notch is in a predetermined position at the read location. Another read head at the read location triggered through the controller by the notch detector each time the exposure data of the respective negative is in the read location reads this data. Another detector generates an output each time a cutout is in a predetermined position at the write location. A write head at the write location triggered through the controller by the cutout detector each time the print is aligned with the write head marks the back of the print strip with the exposure data read by the read head on the respective negative.

5 Claims, 1 Drawing Sheet

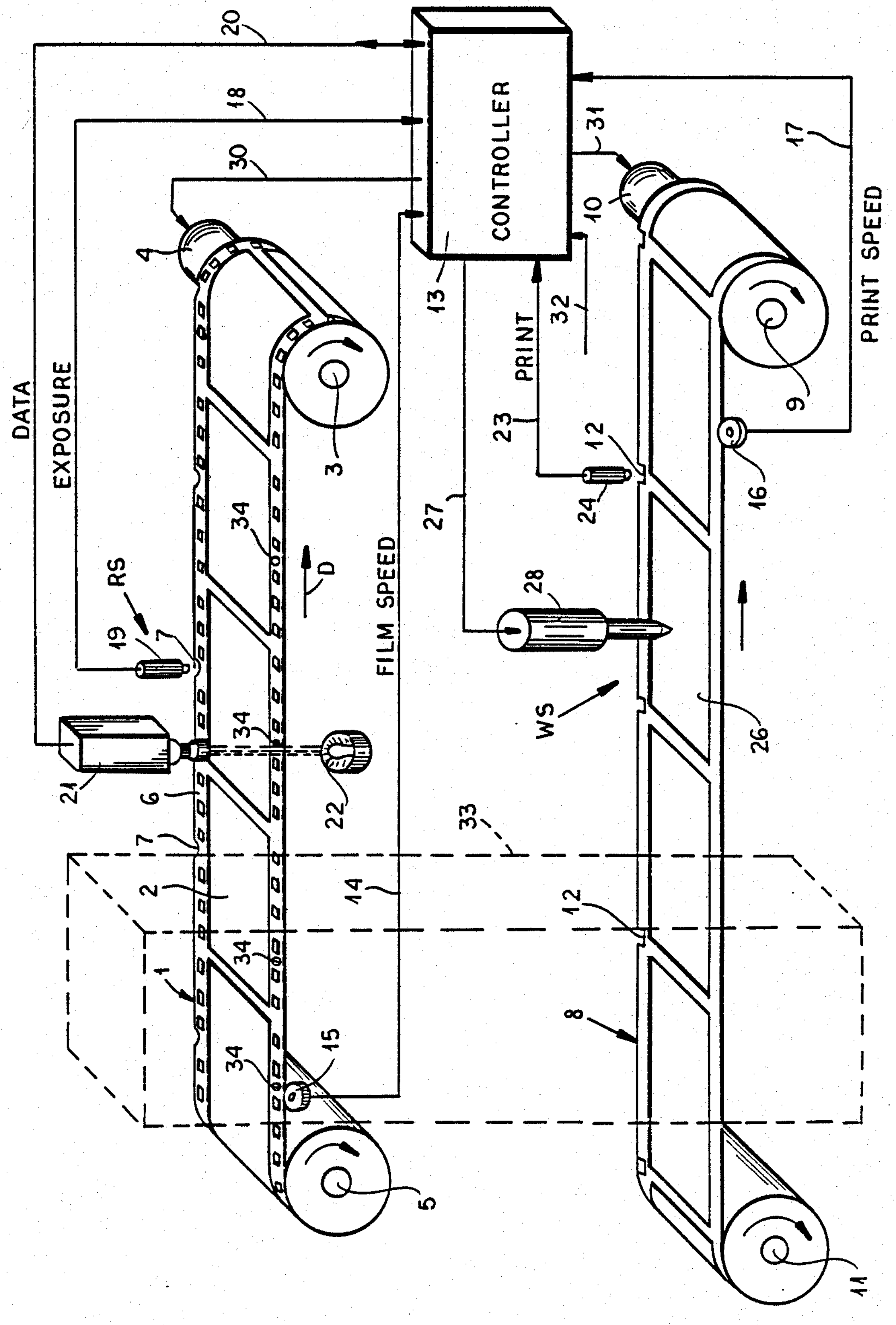
CONTROLLER
DATA
EXPOSURE
FILM SPEED
PRINT
PRINT SPEED
RS
WS
D

APPARATUS FOR MARKING THE BACKS OF PHOTOGRAPHIC PROOFS

FIELD OF THE INVENTION

The present invention relates to a system for marking the back of a photographic proof. More particularly this invention concerns an apparatus for transcribing the negative number and printing the date or other such indicia onto the back of a photographic print.

BACKGROUND OF THE INVENTION

It is standard for a photographic negative strip to carry at the center of each exposure at one edge of the strip a notch, and at the opposite edge in a corresponding location the number of the individual negative or exposure. These exposure numbers make it easy to identify a single exposure on a negative strip for printing.

Unfortunately, however, the problem remains of determining which proof is associated with which numbered negative exposure. Even though the prints of a negative strip are normally made on a paper strip that carries on one edge notches that lie between successive prints, there is nothing to identify which in a succession any single proof is since the proofs are normally cut off the print strip. This is largely due to the fact that the negative strip is in fact the strip exposed by the photographer and is normally supplied and developed in specific lengths, while the print paper strip used for the prints from that negative strip is actually nothing more than a section of a long supply strip held on a roll in the print-making machine. In fact for a photographer who may dispose of a handful of nearly identical photographs, it can be virtually impossible to determine without making a print which negative a given photograph came from.

OBJECT OF THE INVENTION

It is therefore an object of the present invention to provide an improved system for automatically marking identification data on the back of a photographic print.

Another object is the provision of such a system which can be used in conjunction with an automatic developing and/or printing machine to mark each print's back with the corresponding negative number and with other data such as, for example, the film batch or date.

SUMMARY OF THE INVENTION

These objects are attained according to the instant invention in an apparatus for marking the back of a photographic proof with data corresponding to data on the corresponding negatives in a system where the negatives are on a film strip having at each negative an edge notch and the proofs are on a print strip having spaced cutouts. The apparatus of this invention comprises a film drive including an upstream and a downstream drive roll between which the film strip is spanned for advancing same from the upstream to the downstream drive roll past a read location. A sensor between the rolls detects the film-advance speed and generates an output corresponding thereto. A print drive including an upstream and a downstream drive roll between which the print strip is spanned advances this strip from the respective upstream to the respective downstream roll past a write location. Another sensor between the print-strip rolls detects the paper-advance speed and generates an output corresponding thereto. A controller is connected to at least one of the drive means and to the sensors for synchronizing displacement of the strips past the respective locations such that each proof is at the write location generally when the respective negative is at the read location. Another detector between the film drive rolls generates an output each time a notch is in a predetermined position at the read location. Another read head at the read location triggered through the controller by the notch detector each time the exposure data of the respective negative is in the read location reads this data. Another detector between the print drive rolls generates an output each time a cutout is in a predetermined position at the write location. A write head at the write location triggered through the control means by the cutout detector each time the print is aligned with the write head marks the back of the print strip with the exposure data read by the read head on the respective negative.

It is possible according to this invention for the drives and their rolls as well as the detectors synchronizing means of the controller to form part of a standard developing and/or printing apparatus. Such a device normally takes a negative strip, which it can itself have developed, and automatically passes it through a printing station where it makes a print of each such negative on the print strip. Subsequently the individual prints are subdivided at the cutouts, which can be perforations separating individual client orders. The marking system of this invention is provided between the printing and cutting stations of the printing/developing device.

With the system of this invention the back of each proof is normally marked with the same number as its negative as well as the date. A batch, order number, or the like can also be entered. This makes it extremely easy to identify just which proof or print is associated with each negative, so making the match for a reprint is easy.

DESCRIPTION OF THE DRAWING

The above and other objects, features, and advantages will become more readily apparent from the following drawing whose sole figure is a schematic and diagrammatic representation of the system of this invention.

SPECIFIC DESCRIPTION

As seen in the drawing, the system of this invention can constitute part of a developing and printing machine shown schematically at 33. This device 33 advances a negative strip 1 carrying individual developed exposures or negatives 2 from a feed roll 5 to a takeup spool 3, the latter being driven by a motor 4 to move the film strip 1 in a direction D from the region where the negatives 2 may be developed and through a reading station shown generally at RS. In addition the machine 33 moves a print strip 8 carrying individual proofs or prints 26 that each correspond to a single negative 2, advancing them from an upstream idler spool 11 to a downstream drive spool 9, the latter driven by a motor 10.

As is standard the film strip 1 carries on one of its longitudinally perforated edges a sequence of notches 7 that each lie at the exact center of a respective one of the negatives 2 and on the opposite longitudinal edge each negative 2 is associated with indicia such as indicated at 34. The print strip 8 is itself formed along at least one edge with notches 12 that can correspond to the boundaries between succeeding prints 26 or between successive orders from the same client or batch. In this case the notches delimit individual prints 26.

According to the invention the apparatus 33 is provided with a detector 19 connected via a line 18 to a controller 13 and serving to detect the presence of the notches 7 in a particular position in the read station RS, this detector 19 being for instance a simple photosensitive element aligned across the strip edge with a light source. Similarly another such detector 24 is connected via a line 23 to the controller 13 and serves to generate an output when a particular one of the notches 12 is sensed in a predetermined position relative to the station WS.

In addition the strip 1 engages a speed-detecting wheel 15 connected via a line 14 to the controller 13 and the strip 8 similarly rides on a speed-detecting wheel 16 that feeds its speed-indicating output via a line 17 to the controller 13. The controller 13 includes synchronizing circuitry connected to one or both of the drives, here via lines 30 and 31 so that it can ensure synchronous displacement, either both at the same speed or such that the same number of negatives 2 and prints 26 pass the respective stations RS and WS in the same time. Normally displacement is substantially continuous, at least in the post-printing stages.

In accordance with a further feature of this invention the read station RS is provided with a camera 21 aligned with a light source 22 and connected via a line 20 to the controller 13. This camera 21 can read the indicia 34 and generate a normally digital output reproducing it. The indicia 34 is typically a two-digit number arrayed in a predetermined manner and of a standard font so reading and digitizing it is relatively easy. Furthermore the write station WS is provided with an impact, ink-jet, or laser-printing head 28 connected via a line 27 to the controller 13.

The system described above functions as follows:

To start with the drive motor 4 and 10 are advancing the respective strips 1 and 8 synchronously, that is so that the notches 7 and 12 pass the respective detectors 19 and 24 at the same rate.

When the detector 19 detects a notch 7 it signals this presence via the line 18 to the controller 13 which triggers the camera 21 to read the indicia 34 for the respective negative 2. The binary output of this camera 21 is then fed to and stored in the controller via the bidirectional line 20.

Although normally the respective print 26 is centered in the write station WS at the same time its negative 2 is centered in the read station RS, a delay between these positionings is possible. In any case, when the print 26 of a particular negative 2 is in the station WS, the controller 13 actuates the write head 28 to inscribe this print 26 with the number of its negative. In addition other data such as the batch number, client identification, and date can be entered on the print.

In accordance with a further feature of this invention a line 32 can be used to input data about unprintable or unexposed negatives 2 so that the print strip can be stopped, or at least so that nothing can be printed on the back of the respective portion of this strip.

We claim:

1. An apparatus for marking the back of a photographic proof with data corresponding to data on the corresponding negatives, the negatives being on a film strip having at each negative an edge notch and the proofs being on a print strip having spaced cutouts, the apparatus comprising:

film drive means including an upstream and a downstream drive roll between which the film strip is spanned for advancing same from the upstream to the downstream drive roll past a read location;

means including a sensor between the rolls for detecting the film-advance speed and generating an output corresponding thereto;

print drive means including an upstream and a downstream drive roll between which the print strip is spanned for advancing same from the respective upstream to the respective downstream roll past a write location;

means including a sensor between the print-strip rolls for detecting the paper-advance speed and generating an output corresponding thereto;

control means connected to at least one of the drive means and to the sensors for synchronizing displacement of the strips past the respective locations such that each proof is at the write location generally when the respective negative is at the read location;

means including a detector between the film drive rolls for generating an output each time a notch is in a predetermined position at the read location;

means including a read head at the read location triggered through the control means by the notch detector each time the exposure data of the respective negative is in the read location for reading this data;

means including a detector between the print drive rolls for generating an output each time a cutout is in a predetermined position at the write location; and means including a write head at the write location triggered through the control means by the cutout detector each time the print is aligned with the write head for marking the back of the print strip with the exposure data read by the read head on the respective negative.

2. The apparatus defined in claim 1 wherein the read head is a camera.

3. The apparatus defined in claim 1 wherein the write head is an impact-printing head.

4. The apparatus defined in claim 1 wherein the control means is provided with an input energizable to prevent printing on selected print-strip areas corresponding to unexposed negatives.

5. In combination with a photographic device that prints a succession of negatives from a negative film strip as a succession of proofs on a print strip, the negative strip having at each negative a locater notch and exposure indicia, the device comprising:

film drive means including an upstream and a downstream drive roll between which the film strip is spanned for advancing same from the upstream to the downstream drive roll past a read location;

print drive means including an upstream and a downstream drive roll between which the print strip is spanned for advancing same from the respective upstream to the respective downstream roll past a write location; and synchronizing means connected between the drive means for synchronizing displacement of the strips past the respective locations such that each proof is at the write location generally when the respective negative is at the read location; an apparatus for marking the back of each proof with data corresponding to the exposure indicia on the corresponding negatives, means including a detector between the film drive rolls for generating an output each time a notch is in a predetermined position at the read location;

means including a read head at the read location triggered through the control means by the notch detector each time the exposure data of the respective negative is in the read location for reading this data;

means including a detector between the print drive rolls for generating an output each time a cutout is in a predetermined position at the write location;

means including a write head at the write location; and control means connected to the detectors and to the heads for operating the write head each time the print is aligned with the write head for marking the back of the print strip with the exposure data read by the read head on the respective negative.

* * * * *